United States Patent
Abe

(10) Patent No.: US 11,434,396 B2
(45) Date of Patent: Sep. 6, 2022

(54) SYNTHETIC RUBBER PRESSURE-SENSITIVE ADHESIVE, PRESSURE-SENSITIVE ADHESIVE SHEET, AND POLISHING MEMBER LAMINATE

(71) Applicants: TOYO INK SC HOLDINGS CO., LTD., Tokyo (JP); TOYOCHEM CO., LTD., Tokyo (JP)

(72) Inventor: Tadashi Abe, Tokyo (JP)

(73) Assignees: TOYO INK SC HOLDINGS CO., LTD., Tokyo (JP); TOYOCHEM CO., LTD., Tokyo (JP)

( * ) Notice: Subject to any disclaimer, the term of this patent is extended or adjusted under 35 U.S.C. 154(b) by 503 days.

(21) Appl. No.: 16/618,100

(22) PCT Filed: May 28, 2018

(86) PCT No.: PCT/JP2018/020408
§ 371 (c)(1),
(2) Date: Nov. 27, 2019

(87) PCT Pub. No.: WO2018/221468
PCT Pub. Date: Dec. 6, 2018

(65) Prior Publication Data
US 2020/0199413 A1    Jun. 25, 2020

(30) Foreign Application Priority Data
May 29, 2017 (JP) .............................. JP2017-105737

(51) Int. Cl.
| C09J 7/38 | (2018.01) |
| B24B 37/24 | (2012.01) |
| C09J 11/06 | (2006.01) |
| C09J 11/08 | (2006.01) |
| C08K 5/10 | (2006.01) |
| B32B 7/12 | (2006.01) |
| B32B 27/08 | (2006.01) |
| B32B 27/36 | (2006.01) |

(52) U.S. Cl.
CPC ............ *C09J 7/383* (2018.01); *B24B 37/24* (2013.01); *B32B 7/12* (2013.01); *B32B 27/08* (2013.01); *B32B 27/36* (2013.01); *C08K 5/10* (2013.01); *C09J 11/06* (2013.01); *C09J 11/08* (2013.01); *B32B 2405/00* (2013.01); *C09J 2301/408* (2020.08); *C09J 2301/414* (2020.08); *C09J 2409/00* (2013.01); *C09J 2493/00* (2013.01)

(58) Field of Classification Search
CPC ............ C08K 5/10; C09J 7/383; C09J 7/387; C09J 11/06; C09J 11/08; C09J 2301/408; C09J 2409/00; C09J 2493/00
See application file for complete search history.

(56) References Cited

U.S. PATENT DOCUMENTS

| 2013/0244013 A1 | 9/2013 | Nakayama et al. |
| 2013/0245191 A1 | 9/2013 | Okada et al. |
| 2013/0245208 A1 | 9/2013 | Okada et al. |
| 2015/0079388 A1* | 3/2015 | Suzuki .................. B24B 37/20 428/354 |
| 2016/0244013 A1 | 8/2016 | Mori et al. |
| 2016/0245191 A1 | 8/2016 | Saito et al. |

FOREIGN PATENT DOCUMENTS

| CA | 2036982 A1 * | 9/1991 | ............... B05D 3/06 |
| JP | 2001055552 | 2/2001 | |
| JP | 2001123140 | 5/2001 | |
| JP | 2011190420 | 9/2011 | |
| JP | 2013216853 | 10/2013 | |
| JP | 2015078348 | 4/2015 | |
| JP | 2016130283 | 7/2016 | |
| JP | 2016186062 | 10/2016 | |
| JP | 2016186064 | 10/2016 | |
| JP | 2017071726 | 4/2017 | |
| JP | 2017088702 | 5/2017 | |
| JP | 2017149938 | 8/2017 | |
| WO | 2015087405 | 6/2015 | |

OTHER PUBLICATIONS

"International Search Report (Form PCT/ISA/210) of PCT/JP2018/020408", dated Aug. 28, 2018, with English translation thereof, pp. 1-4.
"Office Action of Japan Related Application, application No. 2018-102210", dated Oct. 15, 2019, p. 1-p. 12.

* cited by examiner

*Primary Examiner* — Scott R. Walshon
(74) *Attorney, Agent, or Firm* — JCIPRNET

(57) ABSTRACT

The invention provides a synthetic rubber pressure-sensitive adhesive which has excellent heat resistance and substrate adhesiveness, is capable of inhibiting offset, peeling or the like even in a high-temperature environment and is suitable for applications in a high-temperature environment, a pressure-sensitive adhesive sheet and a polishing member laminate. The synthetic rubber pressure-sensitive adhesive of the invention contains: a synthetic rubber (A) including a styrene-isoprene block copolymer, an adhesion-imparting resin (B), and a fatty acid ester (C) with a weight reduction rate of 1 wt % or less after being heated at 150° C. for 10 minutes. Based on 100 parts by weight of the synthetic rubber (A), the content of the adhesion-imparting resin (B) is set as α parts by weight to 60 parts by weight, and the content of the fatty acid ester (C) is set as 0.1 parts by weight to 10 parts by weight.

13 Claims, No Drawings

SYNTHETIC RUBBER PRESSURE-SENSITIVE ADHESIVE, PRESSURE-SENSITIVE ADHESIVE SHEET, AND POLISHING MEMBER LAMINATE

CROSS-REFERENCE TO RELATED APPLICATION

This application is a 371 application of the international PCT application serial no. PCT/JP2018/020408, filed on May 28, 2018, which claims the priority benefits of Japan application no.2017-105737, filed on May 29, 2017. The entirety of the above-mentioned patent application is hereby incorporated by reference herein and made a part of this specification.

BACKGROUND OF THE INVENTION

1. Field of the Invention

The invention relates to a synthetic rubber pressure-sensitive adhesive suitable for use in applications requiring heat resistance. Further, the invention relates to a pressure-sensitive adhesive sheet and a polishing member laminate which are formed using the synthetic rubber pressure-sensitive adhesive.

2. Description of Related Art

A pressure-sensitive adhesive sheet using a rubber pressure-sensitive adhesive can exhibit excellent adhesion to various adherends, and thus, is used in various industrial fields such as automobile applications, building material applications, home appliance product applications, and polishing member fixing applications. Recently, the use in applications requiring heat resistance has increased. For example, in the case of automobile applications, in addition to the use in the vehicle, it may sometimes be used in a portion that is likely to be high in temperature around the motor portion of the vehicle. In addition, in the polishing member fixing applications, it is used for fixing a polishing member, and thus, may become high in temperature due to frictional heat during polishing or the like.

As a rubber pressure-sensitive adhesive, a pressure-sensitive adhesive which contains a specific amount of a styrene-isoprene-styrene (SIS) block copolymer with an amount of diblock in a specific range, a specific adhesion-imparting resin, and an isocyanate crosslinking agent is disclosed (Patent Document 1). In addition, a pressure-sensitive adhesive composition which contains a raw material polymer including a block copolymer of a monovinyl-substituted aromatic compound and a conjugated diene compound, and an adhesion-imparting resin (TH) with a hydroxyl value of 80 mgKOH/g or more is disclosed (Patent Document 2). In addition, a pressure-sensitive adhesive which contains a styrene-isoprene block copolymer (A) and an adhesion-imparting resin (B), where the styrene-isoprene block copolymer (A) contains a specific amount of a styrene-isoprene diblock copolymer (a1) and a specific amount of styrene-isoprene triblock copolymer (a2), and the adhesion-imparting resin (B) contains an adhesion-imparting resin (b1) with a softening point of 80° C. or more and an adhesion-imparting resin (b2) with a pour point of −5° C. or less (Patent Document 3).

Further, an pressure-sensitive adhesive composition which contains a thermoplastic resin (A), a radical generating agent (B), and a component (C) is disclosed, where the component (C) is selected from at least one of the group consisting of polyethylene wax, polypropylene wax, fatty acid amide, fatty acid ester, and fatty acid metal salt (Patent Document 4).

REFERENCE DOCUMENTS

Patent Documents

Patent Document 1: Japanese Patent Publication No. 2001-123140
Patent Document 2: Japanese Patent Publication No. 2013-216853
Patent Document 3: Japanese Patent Publication No. 2017-088702
Patent Document 4: Japanese Patent Publication No. 2017-071726

SUMMARY OF THE INVENTION

Problems to be Solved by the Invention

However, since a rubber pressure-sensitive adhesive has a poor cohesive force compared with an acrylic pressure-sensitive adhesive or the like, there is a problem that offset or peeling easily occurs when the rubber pressure-sensitive adhesive is used in a high-temperature environment such as automobile applications or polishing applications. In addition, the rubber pressure-sensitive adhesive is generally different from the acrylic pressure-sensitive adhesive. The rubber pressure-sensitive adhesive does not require a step of crosslinking and hardening, and the solvent contained is volatilized during coating and drying such that a coating film is formed, and therefore, the formation of the coating film is completed at the time when the drying of the coating film is completed. Therefore, for example, in the case that after the adhesive is coated on a diaphragm, the solvent contained is volatilized by using a drying oven and then transferred to a polyethylene terephthalate (PET) substrate or the like, adhesiveness to the substrate is prone to deterioration. Particularly in a high-temperature environment, problems such as easy peeling of a pressure-sensitive adhesive layer from the substrate tend to occur. Therefore, a rubber pressure-sensitive adhesive with heat resistance and substrate adhesiveness that can be used in a high-temperature environment is required.

The invention has been made in view of the above background, and provides a synthetic rubber pressure-sensitive adhesive which has excellent heat resistance and substrate adhesiveness, is capable of inhibiting offset, peeling or the like even in a high-temperature environment and is suitable for applications in a high-temperature environment, a pressure-sensitive adhesive sheet and a polishing member laminate.

Solutions to the Problems

The inventors have conducted arduous researches to resolve the above problems and found that the problems can be resolved in the following aspects, thus completing the invention.

[1]: A synthetic rubber pressure-sensitive adhesive, containing a synthetic rubber (A), an adhesion-imparting resin (B), and a fatty acid ester (C), where the synthetic rubber pressure-sensitive adhesive is characterized in that:

the synthetic rubber (A) includes a styrene-isoprene block copolymer, a weight reduction rate of the fatty acid ester (C) after being heated at 150° C. for 10 minutes is 1 wt % or less, and based on 100 parts by weight of the synthetic rubber (A), the content of the adhesion-imparting resin (B) is 5 parts by weight to 60 parts by weight, and the content of the fatty acid ester (C) is 0.1 parts by weight to 10 parts by weight.

[2]: The synthetic rubber pressure-sensitive adhesive according to [1], where the synthetic rubber (A) includes a styrene-isoprene block copolymer with a styrene content of 20 wt % to 40 wt % and a diblock content of 15 wt % to 70 wt %.

[3]: The synthetic rubber pressure-sensitive adhesive according to [1] or [2], where the adhesion-imparting resin (B) includes a terpene phenolic resin with a softening point of 95° C. to 170° C.

[4]: A pressure-sensitive adhesive sheet, with an adhesive layer formed of the synthetic rubber pressure-sensitive adhesive according to any of [1] to [3] on one side or both sides of a substrate.

[5]: The pressure-sensitive adhesive sheet according to [4], used in polishing member fixing applications.

[6]: A polishing member laminate, integrated by bonding the pressure-sensitive adhesive sheet used in polishing member fixing applications according to [5] to a polishing member.

Effects of the Invention

The invention can provide a synthetic rubber pressure-sensitive adhesive which has excellent heat resistance and substrate adhesiveness, is capable of inhibiting offset, peeling or the like even in a high-temperature environment and is suitable for applications in a high-temperature environment, a pressure-sensitive adhesive sheet and a polishing member laminate.

DESCRIPTION OF THE EMBODIMENTS

A synthetic rubber pressure-sensitive adhesive of an embodiment of present invention contains: a synthetic rubber (A) including a styrene-isoprene block copolymer, an adhesion-imparting resin (B), and a fatty acid ester (C) with a weight reduction rate of 1 wt % or less after being heated at 150° C. for 10 minutes. Based on 100 parts by weight of the synthetic rubber (A), the content of the adhesion-imparting resin (B) is set as 5 parts by weight to 60 parts by weight, and the content of the fatty acid ester (C) is set as 0.1 parts by weight to 10 parts by weight.

The synthetic rubber pressure-sensitive adhesive of the embodiment of present invention can be used as a pressure-sensitive adhesive sheet with a substrate by forming an adhesive layer by coating. That is, the synthetic rubber pressure-sensitive adhesive can be used as a pressure-sensitive adhesive sheet with a pressure-sensitive adhesive layer formed of the rubber pressure-sensitive adhesive on one side or both sides of the substrate. The pressure-sensitive adhesive sheet is particularly excellent in heat resistance, and therefore, can also be suitable for use in automobile applications, polishing applications, and the like in a high-temperature environment. Furthermore, the pressure-sensitive adhesive sheet of the embodiment of present invention, a pressure-sensitive adhesive tape and a pressure-sensitive adhesive film are synonymous.

When used in automobile applications, the pressure-sensitive adhesive sheet of the embodiment of present invention is used for the purpose of fixing an automobile part or the like. For example, the pressure-sensitive adhesive sheet can be used for the purpose of bonding automobile interior materials, or bonding foams and the like used in sealing materials, or the like.

When used in polishing applications, the pressure-sensitive adhesive sheet of the embodiment of present invention can be used for bonding a polishing member laminate to a polishing machine. The polishing member laminate is integrated by bonding the pressure-sensitive adhesive sheet to a polishing member such as a polishing pad for polishing purposes. Here, examples of the polishing pad may include a urethane polishing pad, a non-woven polishing pad, a suede-like polishing pad, or the like. The invention is not limited to these as long as the laminate is a polishing member for polishing purposes.

The synthetic rubber pressure-sensitive adhesive of the embodiment of present invention enhances the cohesive force of the pressure-sensitive adhesive layer and the adhesiveness to the substrate, so that offset, peeling, and the like are less likely to occur even in a high-temperature environment. In addition, the pressure-sensitive adhesive sheet of the embodiment of present invention also has acid resistance or alkali resistance, and thus, can be used for fixing either a platform side or a polishing member side. The synthetic rubber pressure-sensitive adhesive of the embodiment of present invention is suitable for use as a pressure-sensitive adhesive sheet for polishing members, which has a pressure-sensitive adhesive layer formed of the pressure-sensitive adhesive for fixing polishing members of the embodiment of present invention on one side or both sides of a substrate.

Synthetic Rubber Pressure-sensitive Adhesive As described above, the synthetic rubber pressure-sensitive adhesive of the embodiment of present invention contains, respectively in a specific amount: a synthetic rubber (A) including a specific copolymer, an adhesion-imparting resin (B), and a fatty acid ester (C) with a weight reduction rate of 1 wt % or less after being heated at 150° C. for 10 minutes. The details will be described below.

<Synthetic Rubber (A)>

A synthetic rubber (A) of the embodiment of present invention contains at least a styrene-isoprene block copolymer. By using the styrene-isoprene block copolymer, a pressure-sensitive adhesive with excellent adhesive performance to various adherends can be obtained.

The styrene-isoprene block copolymer may also use either a linear structure or a radiated structure (radial structure). In the case of having a linear structure, since the styrene-isoprene block copolymer has a structure with high flexibility, it is observed that the adhesiveness to various adherends is excellent and the adhesive performance and heat resistance are more excellent. Therefore, the styrene-isoprene block copolymer is preferably a linear structure including a styrene-isoprene-styrene triblock (SIS) or a styrene-isoprene diblock (SI).

The content of the diblock in the total amount (100 wt %) of the styrene-isoprene block copolymer is preferably 15 wt % to 70 wt %, more preferably 15 wt % to 50 wt %, further more preferably 15 wt % to 25 wt %. When the content of the diblock is 15 wt % to 70 wt %, a certain amount of the diblock with no styrene block is present at a terminal, which can enhance the adhesiveness or adhesion to the adherends. Further, from the viewpoint of imparting heat resistance by physical crosslinking of the styrene block, the content of styrene in the styrene-isoprene block copolymer is preferably 20 wt % to 40 wt %, more preferably 22 wt % to 40 wt %. By being in the range of 20 wt % to 40 wt %, a pressure-sensitive adhesive with excellent cohesive force can be obtained.

Examples of the styrene-isoprene block copolymer may include Quintac 3280 (manufactured by Japan Zeon Co., Ltd., with styrene content of 25 wt % and diblock content of 17 wt %), Quintac 3270 (manufactured by Japan Zeon Co., Ltd., with styrene content of 24 wt % and diblock content of 67 wt %), Quintac 3450 (manufactured by Japan Zeon Co., Ltd., with styrene content of 19 wt % and diblock content of 30 wt %), Quintac 3520 (manufactured by Japan Zeon Co., Ltd., with styrene content of 15 wt % and diblock content of 78 wt %), Quintac 3433N (manufactured by Japan Zeon Co., Ltd., with styrene content of 16 wt % and diblock content of 56 wt %), Quintac 3421 (manufactured by Japan Zeon Co., Ltd., with styrene content of 14 wt % and diblock content of 26 wt %), Quintac 3620 (manufactured by Japan Zeon Co., Ltd., with styrene content of 14 wt % and diblock content of 12 wt %), Kraton D1119 (manufactured by Clayton Co., Ltd., with styrene content of 22 wt % and diblock content of 66 wt %), Kraton D1126 (manufactured by Clayton Co., Ltd., with styrene content of 21 wt % and diblock content of 30 wt %), Kraton D1193 (manufactured by Clayton Co., Ltd., with styrene content of 24 wt % and diblock content of 20 wt %), Kraton D1117 (manufactured by Clayton Co., Ltd., with styrene content of 17 wt % and diblock content of 33 wt %), Kraton D1163 (manufactured by Clayton Co., Ltd., with styrene content of 15 wt % and diblock content of 38 wt %), Kraton D1161 (manufactured by Clayton Co., Ltd., with styrene content of 15 wt % and diblock content of 19 wt %), and the like, but are not limited thereto. The styrene-isoprene block copolymer may be used as needed within a range where the desired properties are not damaged, or two or more types in combination may be used.

If being in the range where the desired properties are not damaged, other synthetic rubbers other than the specific styrene-isoprene block copolymer may also be included. Examples of other synthetic rubbers may include a styrene-butadiene-styrene block copolymer (SBS), a styrene-butadiene rubber (SBR), a polyisoprene rubber (IR), polyisobutylene (PIB), an isobutylene isoprene rubber (IIR), or the like. In the case of containing synthetic rubber other than the styrene-isoprene block copolymer, in 100 wt % of the synthetic rubber (A), in terms of the balance between adhesion and cohesive force, the content of the styrene-isoprene block copolymer is preferably 50 wt % to 100 wt %, more preferably 80 wt % to 100 wt %.

Further, as long as being in the range where the desired properties are not damaged, in addition to the synthetic rubber (A), natural rubber may also be used in combination. The natural rubber is not particularly limited as long as the rubber can be kneaded by a kneading roller and used by adjusting Mooney viscosity, for example, to about 10 to 100. Other synthetic rubbers or natural rubbers are not limited thereto, and one or a combination of two or more may be used.

<Adhesion-Imparting Resin (B)>

In the embodiment of present invention, an adhesion-imparting resin (B) is not particularly limited. Examples of the adhesion-imparting resin may include: rosin-based resins such as abietin, polymerized rosin, hydrogenated rosin, disproportionated rosin, maleic acid-modified rosin, fumaric acid-modified rosin, rosin phenol resin and the like; terpene resins such as α-pinene resin, β-pinene resin, dipentene resin, aromatic modified terpene resin, hydrogenated terpene resin, terpene phenolic resin, acid-modified terpene resin, styrenated terpene resin and the like; and alkylphenol resin, coumarone resin, styrene resin, petroleum resin or a copolymer thereof, and the like, but are not limited thereto. The adhesion-imparting resins may be used alone or in combination of two or more.

A preferred example of the adhesion-imparting resin (B) is the terpene phenolic resin. Since the terpene phenolic resin has excellent compatibility with the styrene-isoprene block copolymer, the terpene phenolic resin is excellent in balance to impart adhesive performance to the styrene-isoprene block copolymer. Furthermore, since the compatibility is good, it is less likely to cause a decrease in cohesive force of the pressure-sensitive adhesive layer caused by the adhesion-imparting resin, and it is possible to inhibit the decrease in cohesive force and impart adhesive performance.

Examples of the terpene phenolic resin may include SylVares TP95 (manufactured by Arizona Chemical Co., Ltd., with a softening point of 95° C.±5° C.), SylVares TP105 (manufactured by Arizona Chemical Co., Ltd., with a softening point 105° C.±5° C.), SylVares TP115 (manufactured by Arizona Chemical Co., Ltd., with a softening point 115° C.±5° C.), YS Polyster U115 (manufactured by Yasuhara Chemical Co., Ltd., with a softening point of 115° C.±5° C.), YS Polyster T80 (manufactured by Yasuhara Chemical Co., Ltd., with a softening point of 80° C.±5° C.), YS Polyster T100 (manufactured by Yasuhara Chemical Co., Ltd., with a softening point of 100° C.±5° C.), YS Polyster T115 (manufactured by Yasuhara Chemical Co., Ltd., with a softening point of 115° C.±5° C.), YS Polyster T130 (manufactured by Yasuhara Chemical Co., Ltd., with a softening point of 130° C.±5° C.), YS Polyster T145 (manufactured by Yasuhara Chemical Co., Ltd., with a softening point of 145° C.±5° C., and the like. The terpene phenolic resin is not limited thereto, and may be used as needed within a range where the desired properties are not damaged. The terpene phenolic resins may be used alone or in combination of two or more.

The adhesion-imparting resin (B) preferably has a softening point of 95° C. to 170° C. By setting the softening point of the adhesion-imparting resin to be within the range to inhibit the decrease in cohesive force caused by the adhesion-imparting resin, the heat resistance is enhanced. From this viewpoint, the softening point is more preferably 110° C. to 150° C.

The content of the adhesion-imparting resin (B) may be 5 parts by weight to 60 parts by weight based on 100 parts by weight of the synthetic rubber (A). By setting the content to be within the range, it is easy to acquire the balance between adhesive performance and cohesive force, and it is possible to inhibit the decrease in cohesive force caused by the adhesion-imparting resin and enhance the heat resistance. From this viewpoint, the content is more preferably 10 parts by weight to 50 parts by weight. From the viewpoint of cohesive force, the content is more preferably 10 parts by weight to 25 parts by weight.

<Fatty Acid Ester (C)>

In the embodiment of present invention, a fatty acid ester (C) can be a known compound which satisfies the characteristic of having a weight reduction rate of 1 wt % or less after being heated at 150° C. for 10 minutes. The heat resistance is imparted to the synthetic rubber pressure-sensitive adhesive of the embodiment of present invention, and therefore, the amount of the adhesion-imparting resin is set as 5 parts by weight to 60 parts by weight as described above. However, if the amount of the adhesion-imparting resin (B) is small, the synthetic rubber pressure-sensitive adhesive tends to be non-viscous and has a decrease in adhesion or adhesiveness. However, the problem can be solved by being used in combination with a certain amount of the fatty acid ester (C). That is, by using a specific amount of the adhesion-imparting resin (B) and a specific amount of the fatty acid ester (C) in combination, a coating film can be given appropriate flexibility, and adhesiveness can be imparted without lowering the heat resistance. In the case of a fatty acid ester with a low volatility, the fatty acid ester is volatilized during drying, and the desired adhesiveness improving effect cannot be obtained. In addition, when drying is performed by using a coater or the like to obtain a pressure-sensitive adhesive sheet, the volatilized fatty acid ester adheres to a drying oven of the coater to cause problems of contamination of the coater and the like. Therefore, it is necessary to use a fatty acid ester with a weight reduction rate of 1 wt % or less after being heated at 150° C. for 10 minutes. By using the fatty acid ester (C) of the embodiment of present invention, the excellent effect of reduced contamination and improved substrate adhesiveness can be played. The weight reduction rate after heating at 150° C. for 10 minutes is more preferably 0.5 wt % or less.

The content of the fatty acid ester (C) may be set as 0.1 parts by weight to 10 parts by weight based on 100 parts by weight of the synthetic rubber (A). By setting the content within the range, the substrate adhesiveness can be enhanced. From this viewpoint, the content is more preferably 0.3 part by weight to 8 parts by weight.

The fatty acid ester (C) imparts flexibility to the coating film, so that fingertip viscosity on the surface of the coating film is enhanced. However, during a storage process of the pressure-sensitive adhesive sheet, the fatty acid ester is volatilized, thereby tending to decrease in the fingertip viscosity on the surface of the coating film. Therefore, it is preferable to use a monoester fatty acid ester or a diester fatty acid ester as follows: having a fingertip viscosity that is not easily decreased, having good substrate adhesiveness in a substrate adhesiveness test, having a weight reduction rate of 1 wt % or less after being heated at 150° C. for 10 minutes, and having an ester bond with high polarity. From the viewpoint of fingertip viscosity, the fatty acid ester is more preferably the diester fatty acid ester.

<Hardener>

In the embodiment of present invention, a hardener may be used as needed. Depending on the applications, from high adhesion to low adhesion, required values are various, but the hardener may be added for the purpose of controlling the adhesion. As the hardener, an isocyanate compound, an aziridine compound, a metal chelate compound, an epoxy compound, or the like may be used as needed within a range where the desired properties are not damaged. The hardeners may be used alone or in combination of two or more.

Examples of the isocyanate compound may include toluene diisocyanate, hexamethylene diisocyanate, isophorone diisocyanate, xylene diisocyanate, hydrogenated xylene diisocyanate, diphenylmethane diisocyanate, hydrogenated diphenylmethane diisocyanate, tetramethyl xylene diisocyanate, naphthalene diisocyanate, triphenylmethane triisocyanate, polymethylene polyphenyl isocyanate and other polyisocyanate compounds. In addition, an adduct, a biuret, and an isocyanurate of the isocyanate compounds and a polylol compound such as trimethylolpropane or the like may also be exemplified. Further, an adduct of the isocyanate compounds and a known polyether glycol or polyester polyol, acrylic polyol, polybutadiene polyol, polyisoprene polyol or the like may be enumerated. The isocyanate compound is preferably an adduct of toluene diisocyanate and trimethylolpropane.

Examples of the aziridine compound may include N,N'-hexamethylene-1,6-bis(1-aziridinecarboxamide), trimethylolpropane-tri-β-aziridine propionate, N,N'-diphenylmethane-4,4'-bis(1-aziridinecarboxamide), trimethylolpropane-tri-β-(2-methylaziridine) propionate, and the like.

The metal chelate compound may, for example, be a metal complex compound. Examples of the metal may include nickel, aluminum, chromium, iron, titanium, zinc, cobalt, manganese, copper, tin, zirconium, and the like. Examples of the metal chelate compound may include iron triacetylacetonate, aluminum triacetylacetonate, aluminum monoacetylacetonate bis(ethyl acetoacetate), aluminum tris(ethyl acetoacetate), and the like, more preferably aluminum triacetylacetonate in the above.

Examples of the epoxy compound may include bisphenol A, epichlorohydrin type epoxy resin, ethylene glycidyl ether, polyethylene glycol diglycidyl ether, glycerol diglycidyl ether, glycerol triglycidyl ether, 1,6-hexanediol glycidyl ether, trimethylolpropane triglycidyl ether, diglycidylaniline, diamine glycidylamine, N,N,N',N'-tetraglycidyl-m-xylenediamine,1,3-bis(N,N'-diamineglycidylaminomethyl)cyclohexane and the like.

<Anti-Aging Agent>

In the embodiment of present invention, an anti-aging agent may be used as needed. The anti-aging agent may be used for the purpose of preventing deterioration of a rubber component and the like. Examples of the anti-aging agent may include NONFLEX WS (manufactured by Seiko Chemical Co., Ltd., anti-aging agent), NONFLEX WS-P (manufactured by Seiko Chemical Co., Ltd., anti-aging agent), NONFLEX MBP (manufactured by Seiko Chemical Co., Ltd., anti-aging agent), NONFLEX CBP (manufactured by Seiko Chemical Co., Ltd., anti-aging agent), NONFLEX EBP (manufactured by Seiko Chemical Co., Ltd., anti-aging agent), NONFLEX TNP (manufactured by Seiko Chemical Co., Ltd., anti-aging agent), NONFLEX MB (manufactured by Seiko Chemical Co., Ltd., anti-aging agent), NONFLEX RD (manufactured by Seiko Chemical Co., Ltd., anti-aging agent), NONFLEX OS (manufactured by Seiko Chemical Co., Ltd., anti-aging agent), and NONFLEX DCD (manufactured by Seiko Chemical Co., Ltd., anti-aging agent). The anti-aging agent is not limited to the above as long as it is an anti-aging agent. The anti-aging agent may be used as needed within a range where the desired properties are not damaged, and may be used alone or in combination of two or more.

In addition, in the embodiment of present invention, the anti-aging agent is used for the purpose of preventing deterioration due to oxidation or the like, or preventing deterioration due to heat, or the like, and an antioxidant, an oxidative deterioration inhibitor, and a thermal deterioration inhibitor are synonymous.

<Other Additives>

In the synthetic rubber pressure-sensitive adhesive of the embodiment of present invention, various additives such as a filler, a pigment, a dye, a diluent, a polymerization inhibitor, an ultraviolet absorber, an ultraviolet stabilizer, a coupling agent and the like that are blended in a known pressure-sensitive adhesive may be included as needed. In addition, the additives may be used alone or in combination of two or more. In addition, the amount of the additive added is not particularly limited as long as it is an amount capable of obtaining desired physical properties.

Pressure-sensitive adhesive sheet

A pressure-sensitive adhesive sheet of the embodiment of present invention has a pressure-sensitive adhesive layer formed of a rubber pressure-sensitive adhesive of the embodiment of present invention on one side or both sides of a substrate. The thickness of the pressure-sensitive adhesive layer is preferably 5 μm-150 μm, more preferably 10 μm-100 μm. By setting the thickness of the pressure-sensitive adhesive layer in the range of 5 μm to 150 μm, a pressure-sensitive adhesive sheet with excellent adhesive performance and heat resistance can be obtained.

The pressure-sensitive adhesive may be coated by using a known method such as a roll coater method, a comma coater method, a lip coater method, a die coater method, a reverse coater method, a silk screen method, a gravure coater method or the like. After coating, drying may be performed by a hot air oven, an infrared heater or the like.

As a substrate, a member capable of using a non-woven, paper, a plastic film, synthetic paper or the like may be used. In the case of the substrate (core material) being used as a pressure-sensitive adhesive sheet, a non-woven and a plastic film are preferable. Examples of the plastic film may include films made of polyolefin such as polyethylene, polypropylene and the like, polyester such as polyethylene terephthalate, polyphenylene sulfide (PPS), nylon, triacetyl cellulose, cycloolefin, polyimide, polyamide, and the like.

The substrate may also be an optical member such as an antireflection (AR) film, a polarizing plate, a phase difference plate or the like, for example, coated with desired coating liquid on the plastic film. In addition, in order to improve the adhesiveness to the pressure-sensitive adhesive layer, the substrate may be subjected to easy adhesion treatment. The easy adhesion treatment may be a known method such as a dry method for performing corona discharge or a wet method for coating an anchor coating agent.

In addition, the substrate may also be a substrate with an antistatic layer, on which an antistatic layer is formed. The antistatic layer is preferably formed of a composition of a blend of an antistatic agent and at least any one of conductive carbon ions, conductive metal particles, a conductive polymer and the like added as needed with a resin. In addition, the substrate with the antistatic layer may be obtained by performing metal evaporation or metal plating on the surface. The thickness of the substrate of the embodiment of present invention is not particularly limited, but is preferably 5 μm to 300 μm. The substrate is more preferably a film which is not subjected to easy adhesion treatment or the like. In the case of a rubber pressure-sensitive adhesive, if the easy adhesion treatment for performing corona discharge is performed, the pressure-sensitive adhesive is prone to be peeled off from the substrate. Therefore, preferably, a rubber pressure-sensitive adhesive is coated on a surface which is not subjected to easy adhesion treatment for performing corona discharge.

According to the pressure-sensitive adhesive sheet, a peeling liner that protects the pressure-sensitive adhesive layer may be provided on the pressure-sensitive adhesive layer just prior to use. The peeling liner during the production of the pressure-sensitive adhesive sheet has, for example, a peeling layer formed by coating a peeling agent on a substrate such as paper, a plastic film, synthetic paper. Examples of the peeling agent may include silicone, an alkyd resin, a melamine resin, a fluororesin, an acrylic resin and the like. Furthermore, the thickness of the peeling liner is not particularly limited, but is about 10 μm to 200 μm.

EXAMPLES

Hereinafter, the invention will be more specifically described by embodiments, but the invention is not limited to the following embodiments. Furthermore, in the examples, "parts" means "parts by weight", and "%" means "wt %".

In addition, methods of measuring the softening point of an adhesion-imparting resin and the volatility of a fatty acid ester are listed as follows.

<Softening Point of Adhesion-Imparting Resin>

The measurement was performed based on Japanese Industrial Standards (JIS) K5902 and JISK2207.

<Volatility of Fatty Acid Ester>

The volatility of the fatty acid ester was determined according to the following sequence. Firstly, a Menturm can with a lid (manufactured by Edogawa Can Co., Ltd., with a lid having a round cover diameter of 46 mm and a height of 15 mm) (hereafter, the Menturm can) was set as weight (X), then about 2 g of a sample was placed into the Menturm can with the lid, and the Menturm can in which the sample was placed was set as weight (Y). Next, the lid of the metal can in which the sample was placed was opened, and after being heated at 150° C. for 10 minutes, the Menturm can was taken out, and the lid was immediately placed back. After being left to cool at normal temperature, the heated Menturm can with the lid and the sample therein was set as weight (Z).

The weight reduction rate after heating was performed at 150° C. for 10 minutes was calculated using the following formula 1.

$$\text{Weight reduction rate (\%)}=100-((Z-X)/(Y-X))\times 100 \quad \text{(Formula 1)}$$

Example 1

(Rubber Pressure-Sensitive Adhesive 1)

100 parts by weight of D1119 manufactured by Clayton Co., Ltd. as a synthetic rubber, and a proper amount of methyl ethyl ketone and toluene as a solvent were added into a four-neck flask provided with a stirrer, a thermometer, a reflux condenser, a dropping device and a nitrogen inlet tube in a nitrogen environment. Then, the flask was slowly heated, and heating was continued at an internal temperature of about 50° C. for 3 hours. After the completion of the heating, cooling was performed, and at an internal temperature of about 40° C. or less, 25 parts by weight of YS Polyster T115 (manufactured by Yasuhara Chemical Co., Ltd.) as an adhesion-imparting resin, 2 parts by weight of Unister MB-1381 (manufactured by Nippon Oil & Energy Corporation) as a fatty acid ester, 2 parts by weight of NONFLEX EBP (manufactured by Seiko Chemical Co., Ltd.) as an anti-aging agent were added, the mixture was diluted with the methyl ethyl ketone and the toluene, stirring was continued until the adhesion-imparting resin was dissolved, and a rubber pressure-sensitive adhesive solution (pressure-sensitive adhesive 1) with a nonvolatile content of 40.0% and a viscosity of 1500 mPa·s was obtained.

Example 2-Example 26, Comparative Example 1-Comparative Example 7

(Rubber Adhesive 2-Rubber Pressure-Sensitive Adhesive 33)

In addition to the changes of the types and the blending amounts (parts by weight of nonvolatile content) of the synthetic rubber, the adhesion-imparting resin and the fatty acid ester as shown in Table 1 to Table 3, a solution of the rubber pressure-sensitive adhesive (pressure-sensitive adhesive 2-pressure-sensitive adhesive 33) was obtained in the same manner as the pressure-sensitive adhesive 1 of Example 1.

TABLE 1

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| | | Adhesive | | | | | | | | | | | | | |
| | | 1 | 2 | 3 | 4 | 5 | 6 | 7 | 8 | 9 | 10 | 11 | 12 | 13 | 14 |
| Synthetic Rubber | Kraton D1119 | 100.0 | | | | 100.0 | 100.0 | 100.0 | 100.0 | 100.0 | 100.0 | 100.0 | 100.0 | 100.0 | 100.0 |
| | Quintac 3270 | | 100.0 | | | | | | | | | | | | |
| | Kraton D1161 | | | 100.0 | | | | | | | | | | | |
| | Quintac 3620 | | | | 100.0 | | | | | | | | | | |
| Adhesion-Imparting Resin | YS POLYSTER T115 | 25.0 | 25.0 | 25.0 | 25.0 | | | | | 25.0 | 25.0 | 10.0 | 60.0 | 25.0 | 25.0 |
| | YS POLYSTER T130 | | | | | 25.0 | | | | | | | | | |
| | YS POLYSTER T100 | | | | | | 25.0 | | | | | | | | |
| | YS POLYSTER T80 | | | | | | | 25.0 | | | | | | | |
| | PENSEL D125 | | | | | | | | 25.0 | | | | | | |
| Fatty Acid Ester | Unister MB-1381 | 2.0 | 2.0 | 2.0 | 2.0 | 2.0 | 2.0 | 2.0 | 2.0 | | | 2.0 | 2.0 | 0.1 | 10.0 |
| | Unister HP-281R | | | | | | | | | 2.0 | | | | | |
| | Unister HR-20B | | | | | | | | | | 2.0 | | | | |
| | Unister M-182A | | | | | | | | | | | | | | |
| | Unister H-208BRS | | | | | | | | | | | | | | |
| Anti-Aging Agent | NONFLEX EBP | 2.0 | 2.0 | 2.0 | 2.0 | 2.0 | 2.0 | 2.0 | 2.0 | 2.0 | 2.0 | 2.0 | 2.0 | 2.0 | 2.0 |

TABLE 2

| | | Comparative Example | | | | | | |
|---|---|---|---|---|---|---|---|---|
| | | 1 | 2 | 3 | 4 | 5 | 6 | 7 |
| | | Adhesive | | | | | | |
| | | 15 | 16 | 17 | 18 | 19 | 20 | 21 |
| Synthetic Rubber | Kraton D1119 | 100.0 | 100.0 | 100.0 | 100.0 | 100.0 | 100.0 | 100.0 |
| | Quintac 3270 | | | | | | | |
| | Kraton D1161 | | | | | | | |
| | Quintac 3620 | | | | | | | |
| Adhesion-Imparting Resin | YS POLYSTER T115 | | 2.5 | 70.0 | 25.0 | 25.0 | 25.0 | 25.0 |
| | YS POLYSTER T130 | | | | | | | |
| | YS POLYSTER T100 | | | | | | | |
| | YS POLYSTER T80 | | | | | | | |
| | PENSEL D125 | | | | | | | |
| Fatty Acid Ester | Unister MB-1381 | 2.0 | 2.0 | 2.0 | | 15.0 | | |
| | Unister HP-281R | | | | | | | |
| | Unister HR-20B | | | | | | | |
| | Unister M-182A | | | | | | 2.0 | |
| | Unister H-208BRS | | | | | | | 2.0 |
| Anti-Aging Agent | NONFLEX EBP | 2.0 | 2.0 | 2.0 | 2.0 | 2.0 | 2.0 | 2.0 |

TABLE 3

| | | Example | | | | | | | | | | | |
|---|---|---|---|---|---|---|---|---|---|---|---|---|---|
| | | 15 | 16 | 17 | 18 | 19 | 20 | 21 | 22 | 23 | 24 | 25 | 26 |
| | | Adhesive | | | | | | | | | | | |
| | | 22 | 23 | 24 | 25 | 26 | 27 | 28 | 29 | 30 | 31 | 32 | 33 |
| Synthetic Rubber | Kraton D1119 | | | | 100.0 | 100.0 | 100.0 | 100.0 | 100.0 | 100.0 | 100.0 | 100.0 | 100.0 |
| | Quintac 3270 | 100.0 | | | | | | | | | | | |
| | Kraton D1161 | | 100.0 | | | | | | | | | | |
| | Quintac 3620 | | | 100.0 | | | | | | | | | |
| Adhesion-Imparting Resin | YS POLYSTER T115 | 25.0 | 25.0 | 25.0 | | | | | 10.0 | 30.0 | 50.0 | 25.0 | 25.0 |
| | YS POLYSTER T130 | | | | 25.0 | | | | | | | | |
| | YS POLYSTER T100 | | | | | 25.0 | | | | | | | |
| | YS POLYSTER T80 | | | | | | 25.0 | | | | | | |
| | PENSEL D125 | | | | | | | 25.0 | | | | | |
| Fatty Acid Ester | Unister MB-1381 | | | | | | | | | | | | |
| | Unister HP-281R | | | | | | | | | | | | |
| | Unister HR-20B | 2.0 | 2.0 | 2.0 | 2.0 | 2.0 | 2.0 | 2.0 | 2.0 | 2.0 | 2.0 | 0.1 | 10.0 |
| | Unister M-182A | | | | | | | | | | | | |
| | Unister H-208BRS | | | | | | | | | | | | |
| Anti-Aging Agent | NONFLEX EBP | 2.0 | 2.0 | 2.0 | 2.0 | 2.0 | 2.0 | 2.0 | 2.0 | 2.0 | 2.0 | 2.0 | 2.0 |

The abbreviations in Table 1 to Table 3 are listed as follows. In addition, the blending amount is an amount (parts by weight) added of a nonvolatile content relative to the solid content of the synthetic rubber.

<Synthetic Rubber: Styrene-Isoprene Block Copolymer (Wt %)>

Kraton D1119
(manufactured by Clayton Co., Ltd., with styrene content of 22 wt % and diblock content of 66 wt %, and a linear structure)

Quintac 3270
(manufactured by Japan Zeon Co., Ltd., with styrene content of 24 wt % and diblock content of 67 wt %, and a linear structure)

Kraton D1161
(manufactured by Clayton Co., Ltd., with styrene content of 15 wt % and diblock content of 19 wt %, and a linear structure)

Quintac 3620
(manufactured by Japan Zeon Co., Ltd., with styrene content of 14 wt % and diblock content of 12 wt %, and a linear structure)

<Adhesion-Imparting Resin>

YS Polyster T115
(Manufactured by Yasuhara Chemical Co., Ltd., terpene phenolic resin, with a softening point of 115° C.)

YS Polyster T130
(manufactured by Yasuhara Chemical Co., Ltd., terpene phenolic resin, with a softening point of 130° C.)

YS Polyster T100
(manufactured by Yasuhara Chemical Co., Ltd., terpene phenolic resin, with a softening point of 100° C.)

YS Polyster T80
(manufactured by Yasuhara Chemical Co., Ltd., terpene phenolic resin, with a softening point of 80° C.)

PENSEL D125
(manufactured by Arakawa Chemical Industries Ltd., abietin resin, with a softening point of 125° C.)

<Fatty Acid Ester>

Unister MB-1381 (manufactured by Nippon Oil & Energy Corporation, monoester, with a weight reduction rate of 0.1%)

Unister HP-281R (manufactured by Nippon Oil & Energy Corporation, diester, with a weight reduction rate of 0.1%)

Unister HR-20B (manufactured by Nippon Oil & Energy Corporation, diester, with a weight reduction rate of 0.1%)

Unister M-182A (manufactured by Nippon Oil & Energy Corporation, monoester, with a weight reduction rate of 4.5%)

Unister H-208BRS (manufactured by Nippon Oil & Energy Corporation, diester, with a weight reduction rate of 3.5%)

<Additive>

NONFLEX EBP (manufactured by Seiko Chemical Co., Ltd., anti-aging agent)

<Evaluation of Pressure-Sensitive Adhesive Sheet>

The pressure-sensitive adhesive sheet was formed using the obtained rubber pressure-sensitive adhesive, and evaluated by the following method. The evaluation results are shown in Table 4 to Table 8.

(Production of pressure-sensitive adhesive sheet)

A pressure-sensitive adhesive sheet in which a first peeling liner, a first pressure-sensitive adhesive layer, a substrate, a second pressure-sensitive adhesive layer and a second peeling liner were laminated in sequence was produced. Specifically, as shown in Table 4 to Table 8, the obtained rubber pressure-sensitive adhesive was coated on the 25 μm first peeling liner in a manner of having a thickness of 40 μm after drying, and dried at 100° C. for 10 minutes, thereby obtaining the first pressure-sensitive adhesive layer. Thereafter, the first pressure-sensitive adhesive layer was bonded to a PET film substrate. Next, the obtained rubber pressure-sensitive adhesive was coated on the second peeling liner in a manner of having a thickness of 30 μM after drying, and dried at 100° C. for 10 minutes, thereby obtaining the second pressure-sensitive adhesive layer. Furthermore, the second pressure-sensitive adhesive layer was bonded to the surface of the PET film substrate on which the first pressure-sensitive adhesive layer was not bonded, and allowed to stand in a 23° C.-50% RH environment for one week, thereby obtaining the pressure-sensitive adhesive sheet.

(Adhesion)

The second peeling liner of the obtained pressure-sensitive adhesive sheet was peeled off, and the exposed second pressure-sensitive adhesive layer was bonded to a 25 μm PET film. Furthermore, a size of 25 mm in width×100 mm in length was made and used as a sample. Then, in a 23° C.-50% RH environment, the first peeling liner was peeled off, and the exposed first pressure-sensitive adhesive layer was subjected to a round trip crimping on a stainless steel plate (adhesion to SUS) or a polypropylene plate (adhesion to PP) using a 2 kg roller. Furthermore, the obtained sample was allowed to stand for 20 minutes or 24 hours. Thereafter, the respective adhesives were measured for adhesion of the first pressure-sensitive adhesive layer under the conditions of a peeling angle of 180 degrees and a peeling speed of 0.3 m/min by using a tensile tester in a 23° C.-50% RH environment based on a JISZ1528 measuring method. The adhesion of the second pressure-sensitive adhesive layer was measured by the same method.

(Retention)

The second peeling liner of the obtained pressure-sensitive adhesive sheet was peeled off, and the exposed second pressure-sensitive adhesive layer was bonded to a 25 μm PET film. Furthermore, a size of 25 mm in width×100 mm in length was made and used as a sample. Then, in a 23° C.-50% RH environment, the first peeling liner was peeled off by 25 mm in length×25 mm in width, and the exposed first pressure-sensitive adhesive layer was subjected to a round trip crimping on a stainless steel plate using a 2 kg roller, and the sample was allowed to stand in the 23° C.-50% RH environment for 20 minutes. Thereafter, a weight of 1 kg was mounted in an 80° C. environment, and was arranged in a manner of applying a force in a direction of 180 degrees. After 24 hours, how many millimeters the pressure-sensitive adhesive sheet was offset from the adherend was measured. In addition, when the pressure-sensitive adhesive sheet was completely detached from the adherend, the number of seconds of dropping was measured. The retention of the second pressure-sensitive adhesive layer was measured by the same method.

(Acid Resistance)

The second peeling liner of the obtained pressure-sensitive adhesive sheet was peeled off, and the exposed second pressure-sensitive adhesive layer was bonded to a 25 μm PET film. Furthermore, a size of 25 mm in width×100 mm in length was made and used as a sample. Then, in a 23° C.-50% RH environment, the first peeling liner was peeled off, the exposed first pressure-sensitive adhesive layer was subjected to a round trip crimping on a stainless steel plate (adhesion to SUS) using a 2 kg roller, and the sample was allowed to stand in the 23° C.-50% RH environment for 24 hours. Thereafter, the sample was immersed in an aqueous solution adjusted to pH 1.5 with sulfuric acid, and allowed to stand in a 40° C. environment for another 24 hours. Thereafter, the sample was taken out from the aqueous solution, washed with water, and then allowed to stand in the 23° C.-50% RH environment for 1 hour. Thereafter, in the 23° C.-50% RH environment, the adhesion was measured at a peeling speed of 300 mm/min by using a tensile test based on a JISZ1528 measuring method. It is observed that that the smaller the difference in the value of the adhesion (the adhesion of the sample crimped to the stainless steel plate at a peeling angle of 180 degrees after standing for 24 hours (hereinafter also referred to as "adhesion to stainless steel plate at 180 degrees after 24 hours")) to the stainless steel plate measured in the evaluation of the "adhesion", the more excellent the acid resistance.

Adhesion difference=(adhesion after immersion in pH 1.5 aqueous solution)−(adhesion to stainless steel plate at 180 degrees after 24 hours)

The acid resistance of the second pressure-sensitive adhesive layer was measured by the same method.

(Alkali Resistance)

The second peeling liner of the obtained pressure-sensitive adhesive sheet was peeled off, and the exposed second pressure-sensitive adhesive layer was bonded to a 25 μm PET film. Furthermore, a size of 25 mm in width×100 mm in length was made and used as a sample. Then, in a 23° C.-50% RH environment, the first peeling liner was peeled off, the exposed first pressure-sensitive adhesive layer was subjected to a round trip crimping on a stainless steel plate (adhesion to SUS) using a 2 kg roller, the sample was allowed to stand in the 23° C.-50% RH environment for 20 minutes such that the exposed first pressure-sensitive adhesive layer was attached to the stainless steel plate, and the obtained sample was allowed to stand in the 23° C.-50% RH environment for 24 hours. Thereafter, the sample was immersed in an aqueous solution adjusted to pH 11.5 with sodium hydroxide, and allowed to stand in a 40° C. environment for another 24 hours. Thereafter, the sample was taken out from the aqueous solution, washed with water, and then allowed to stand in the 23° C.-50% RH environment for 1 hour. Thereafter, in the 23° C.-50% RH environment, the adhesion was measured at a peeling speed of 300 mm/min by using a tensile test based on a JISZ1528 measuring method. It is observed that the smaller the difference in the value of the adhesion to the stainless steel plate at 180 degrees after 24 hours measured in the evaluation of the "adhesion", the more excellent the alkali resistance.

Adhesion difference=(adhesion after immersion in pH 11.5 aqueous solution)−(adhesion to stainless steel plate at 180 degrees after 24 hours)

The alkali resistance of the second pressure-sensitive adhesive layer was measured by the same method.

(Substrate Adhesiveness)

The second peeling liner of the obtained pressure-sensitive adhesive sheet was peeled off, and the exposed second pressure-sensitive adhesive layer was bonded to a 25 μm PET film substrate. Furthermore, two samples each cut into a size of 25 mm in width×100 mm in length were prepared, and were used as measurement samples. Then, in a 23° C.-50% RH environment, the first peeling liners were peeled from the obtained two samples, and the exposed first pressure-sensitive adhesive layer surfaces were bonded to each other, subjected to a round trip crimping using a 2 kg roller, and allowed to stand for 20 minutes. Furthermore, the measurement was performed under the conditions of a peeling angle of 90 degrees and a peeling speed of 0.3 m/min by using a tensile tester.

E: No peeling of the pressure-sensitive adhesive layer from the substrate occurred. (Good)

G: The pressure-sensitive adhesive layer was slightly peeled off from the substrate (when the joint surface was set to 100, the peeling was less than 30%). (Available Range)

NG: Most of the pressure-sensitive adhesive layer was peeled off from the substrate (30% or more when the joint surface was set to 100). (Not available)

(Contamination)

The obtained pressure-sensitive adhesive was coated by 100 m in a manner of having a thickness of 50 μm after drying under the conditions of a coating width of 200 mm, a temperature of 130° C. and a coating speed of 0.5 m/min by using a test coater. After the completion of the coating, a glass window provided for observing the inside of a drying oven was observed, and the contamination based on the volatilization of the fatty acid ester was evaluated according to the presence or absence of fogging.

E: No fogging occurred. (Good)

NG: Fogging occurred. (Not available)

(Time-Dependent Fingertip Viscosity)

The obtained pressure-sensitive adhesive sheet was placed in a 40° C. drying oven for 1 week, taken out, and placed in a 23° C.-50% RH environment for 24 hours (sample 1). A part of the peeling liner on the second surface of the sample 1 placed for 24 hours was peeled off, and the fingertip viscosity of the exposed pressure-sensitive adhesive layer was determined. Thereafter, the same sample was placed in a 40° C. drying oven for three weeks (one month in total), taken out, and placed in a 23° C.-50% RH environment for 24 hours (sample 2). A part of the peeling liner on the second surface of the sample 2 placed for 24 hours was peeled off, and the fingertip viscosity of the exposed pressure-sensitive adhesive layer was determined, and compared with the fingertip viscosity after one week.

E: No change compared with fingertip viscosity after one week of curing (Good)

G: Slightly lower than fingertip viscosity after one week of curing (Available range)

NG: Significantly lower than fingertip viscosity after one week of curing (Not available)

TABLE 4

| | | Example 1 Adhesive 1 | | Example 2 Adhesive 2 | | Example 3 Adhesive 3 | | Example 4 Adhesive 4 | | Example 5 Adhesive 5 | | Example 6 Adhesive 6 | | Example 7 Adhesive 7 | |
|---|---|---|---|---|---|---|---|---|---|---|---|---|---|---|---|
| | | First Side | Second Side | First Side | Second Side | First Side | Second Side | First Side | Second Side | First Side | Second Side | First Side | Second Side | First Side | Second Side |
| Coating Thickness [μm] | | 40 | 30 | 40 | 30 | 40 | 30 | 40 | 30 | 40 | 30 | 40 | 30 | 40 | 30 |
| Adhesion | To SUS (after 20 minutes) [N/25 mm] | 28.0 | 22.0 | 27.5 | 21.5 | 20.0 | 14.0 | 20.5 | 14.5 | 27.5 | 21.5 | 28.5 | 22.5 | 28.5 | 22.5 |

TABLE 4-continued

|  |  | Example 1 Adhesive 1 | | Example 2 Adhesive 2 | | Example 3 Adhesive 3 | | Example 4 Adhesive 4 | | Example 5 Adhesive 5 | | Example 6 Adhesive 6 | | Example 7 Adhesive 7 | |
| --- | --- | --- | --- | --- | --- | --- | --- | --- | --- | --- | --- | --- | --- | --- | --- |
|  |  | First Side | Second Side | First Side | Second Side | First Side | Second Side | First Side | Second Side | First Side | Second Side | First Side | Second Side | First Side | Second Side |
|  | To SUS (after 24 hours) [N/25 mm] | 31.0 | 25.0 | 30.5 | 24.5 | 23.0 | 17.0 | 23.5 | 17.5 | 30.5 | 24.5 | 31.5 | 25.5 | 31.5 | 25.5 |
|  | To PP (after 20 minutes) (N/25 mm) | 26.0 | 20.0 | 25.5 | 19.5 | 18.0 | 12.0 | 18.5 | 12.5 | 25.5 | 19.5 | 26.5 | 20.5 | 26.5 | 20.5 |
|  | To PP (after 24 hours) (N/25 mm) | 27.0 | 21.0 | 26.5 | 20.5 | 19.0 | 13.0 | 19.5 | 13.5 | 26.5 | 20.5 | 27.5 | 21.5 | 27.5 | 21.5 |
| Retention (offset [mm] or seconds of dropping [s]) |  | 3.5 mm | 3.0 mm | 3.5 mm | 3.0 mm | 7.5 mm | 7.0 mm | 8.0 mm | 7.5 mm | 3.0 mm | 2.5 mm | 6.5 mm | 6.0 mm | 7.5 mm | 7.0 mm |
| Acid Resistance | Adhesion [N/25 mm] | 32.0 | 26.0 | 31.5 | 25.5 | 25.0 | 19.0 | 25.5 | 19.5 | 31.5 | 25.5 | 32.5 | 26.5 | 34.5 | 28.5 |
|  | Adhesion Difference [N/25 mm] | 1.0 | 1.0 | 1.0 | 1.0 | 2.0 | 2.0 | 2.0 | 2.0 | 1.0 | 1.0 | 1.0 | 1.0 | 3.0 | 3.0 |
| Alkali Resistance | Adhesion [N/25 mm] | 32.5 | 26.5 | 32.0 | 26.0 | 25.5 | 19.5 | 26.0 | 20.0 | 32.0 | 26.0 | 33.0 | 27.0 | 35.0 | 29.0 |
|  | Adhesion Difference [N/25 mm] | 1.5 | 1.5 | 1.5 | 1.5 | 2.5 | 2.5 | 2.5 | 2.5 | 1.5 | 1.5 | 1.5 | 1.5 | 3.5 | 3.5 |
| Substrate Adhesiveness |  | E | | E | | E | | E | | E | | E | | E | |
| Contamination |  | E | | E | | E | | E | | E | | E | | E | |
| Time-Dependent Fingertip Viscosity |  | G | | G | | G | | G | | G | | G | | G | |

TABLE 5

|  |  | Example 8 Adhesive 8 | | Example 9 Adhesive 9 | | Example 10 Adhesive 10 | | Example 11 Adhesive 11 | | Example 12 Adhesive 12 | | Example 13 Adhesive 13 | | Example 14 Adhesive 14 | |
| --- | --- | --- | --- | --- | --- | --- | --- | --- | --- | --- | --- | --- | --- | --- | --- |
|  |  | First Side | Second Side | First Side | Second Side | First Side | Second Side | First Side | Second Side | First Side | Second Side | First Side | Second Side | First Side | second side |
| Coating Thickness [μm] |  | 40 | 30 | 40 | 30 | 40 | 30 | 40 | 30 | 40 | 30 | 40 | 30 | 40 | 30 |
| Adhesion | To SUS (after 20 minutes) [N/25 mm] | 28.5 | 22.5 | 28.0 | 22.0 | 28.0 | 22.0 | 20.0 | 14.0 | 32.0 | 26.0 | 27.5 | 21.5 | 20.5 | 14.5 |
|  | To SUS (after 24 hours) [N/25 mm] | 31.5 | 25.5 | 31.0 | 25.0 | 31.0 | 25.0 | 23.0 | 17.0 | 35.0 | 29.0 | 30.5 | 24.5 | 23.5 | 17.5 |
|  | To PP (after 20 minutes) (N/25 mm) | 26.5 | 20.5 | 26.0 | 20.0 | 26.0 | 20.0 | 18.0 | 12.0 | 30.0 | 24.0 | 25.5 | 19.5 | 18.5 | 12.5 |
|  | To PP (after 24 hours) (N/25 mm) | 27.5 | 21.5 | 27.0 | 21.0 | 27.0 | 21.0 | 19.0 | 13.0 | 31.0 | 25.0 | 26.5 | 20.5 | 19.5 | 13.5 |
| Retention (offset [mm] or seconds of dropping [s]) |  | 8.0 mm | 7.5 mm | 3.5 mm | 3.0 mm | 3.5 mm | 3.0 mm | 1.5 mm | 1.0 mm | 6.5 mm | 6.0 mm | 3.0 mm | 2.5 mm | 6.5 mm | 6.0 mm |
| Acid Resistance | Adhesion [N/25 mm] | 32.5 | 26.5 | 32.0 | 26.0 | 32.0 | 26.0 | 24.0 | 18.0 | 35.5 | 29.5 | 31.5 | 25.5 | 24.0 | 18.0 |
|  | Adhesion Difference [N/25 mm] | 1.0 | 1.0 | 1.0 | 1.0 | 1.0 | 1.0 | 1.0 | 1.0 | 0.5 | 0.5 | 1.0 | 1.0 | 0.5 | 0.5 |
| Alkali Resistance | Adhesion [N/25 mm] | 33.0 | 27.0 | 32.5 | 26.5 | 32.5 | 26.5 | 24.5 | 18.5 | 36.0 | 30.0 | 32.0 | 26.0 | 24.5 | 18.5 |
|  | Adhesion Difference [N/25 mm] | 1.5 | 1.5 | 1.5 | 1.5 | 1.5 | 1.5 | 1.5 | 1.5 | 1.0 | 1.0 | 1.5 | 1.5 | 1.0 | 1.0 |
| Substrate Adhesiveness |  | E | | E | | E | | E | | E | | G | | E | |
| Contamination |  | E | | E | | E | | E | | E | | E | | E | |
| Time-Dependent Fingertip Viscosity |  | G | | E | | E | | G | | G | | G | | G | |

TABLE 6

|  |  | Comparative Example 1 Adhesive 15 | | Comparative Example 2 Adhesive 16 | | Comparative Example 3 Adhesive 17 | | Comparative Example 4 Adhesive 18 | | Comparative Example 5 Adhesive 19 | | Comparative Example 6 Adhesive 20 | | Comparative Example 7 Adhesive 21 | |
| --- | --- | --- | --- | --- | --- | --- | --- | --- | --- | --- | --- | --- | --- | --- | --- |
|  |  | First Side | Second Side | First Side | Second Side | First Side | Second Side | First Side | Second Side | First Side | Second Side | First Side | Second Side | First Side | Second Side |
| Coating Thickness [μm] |  | 40 | 30 | 40 | 30 | 40 | 30 | 40 | 30 | 40 | 30 | 40 | 30 | 40 | 30 |
| Adhesion | To SUS (after 20 minutes) [N/25 mm] | Failure in measurement since not bonded to adherend | | 5.0 | 1.0 | 32.0 | 26.0 | 28.0 | 22.0 | 20.5 | 14.5 | 28.0 | 22.0 | 28.0 | 22.0 |
|  | To SUS (after 24 hours) [N/25 mm] |  |  | 8.5 | 2.0 | 35.0 | 29.0 | 31.0 | 25.0 | 23.5 | 17.5 | 31.0 | 25.0 | 31.0 | 25.0 |
|  | To PP (after 20 minutes) (N/25 mm) |  |  | 3.5 | 1.0 | 30.0 | 24.0 | 26.0 | 20.0 | 18.5 | 12.5 | 26.0 | 20.0 | 26.0 | 20.0 |
|  | To PP (after 24 hours) (N/25 mm) |  |  | 4.5 | 1.5 | 31.0 | 25.0 | 27.0 | 21.0 | 19.5 | 13.5 | 27.0 | 21.0 | 27.0 | 21.0 |
| Retention (offset [mm] or seconds of dropping [s]) |  |  |  | 0.5 mm | 0.1 mm | Dropping | Dropping | 3.5 mm | 3.0 mm | Dropping | Dropping | 3.5 mm | 3.0 mm | 3.5 mm | 3.0 mm |
| Acid Resistance | Adhesion [N/25 mm] |  |  | 8.0 | 3.0 | 34.0 | 30.0 | 32.0 | 26.0 | 24.5 | 18.5 | 32.0 | 26.0 | 32.0 | 26.0 |
|  | Adhesion Difference [N/25 mm] |  |  | 3.5 | 1.5 | 3.0 | 5.0 | 5.0 | 5.0 | 5.0 | 5.0 | 5.0 | 5.0 | 5.0 | 5.0 |
| Alkali Resistance | Adhesion [N/25 mm] |  |  | 10.5 | 3.5 | 36.5 | 30.5 | 32.5 | 26.5 | 25.0 | 19.0 | 32.5 | 26.5 | 32.5 | 26.5 |
|  | Adhesion Difference [N/25 mm] |  |  | 6.0 | 2.0 | 5.5 | 5.5 | 5.5 | 5.5 | 5.5 | 5.5 | 5.5 | 5.5 | 5.5 | 5.5 |
| Substrate Adhesiveness |  | E | | E | | E | | NG | | E | | G | | G | |
| Contamination |  | E | | E | | E | | E | | E | | NG | | NG | |
| Time-Dependent Fingertip Viscosity |  | G | | G | | G | | NG | | E | | G | | E | |

TABLE 7

|  |  | Example 15 Adhesive 22 | | Example 16 Adhesive 23 | | Example 17 Adhesive 24 | | Example 18 Adhesive 25 | | Example 19 Adhesive 26 | | Example 20 Adhesive 27 | | Example 21 Adhesive 28 | |
| --- | --- | --- | --- | --- | --- | --- | --- | --- | --- | --- | --- | --- | --- | --- | --- |
|  |  | First Side | Second Side | First Side | Second Side | First Side | Second Side | First Side | Second Side | First Side | Second Side | First Side | Second Side | First Side | Second Side |
| Coating Thickness [μm] |  | 40 | 30 | 40 | 30 | 40 | 30 | 40 | 30 | 40 | 30 | 40 | 30 | 40 | 30 |
| Adhesion | To SUS (after 20 minutes) [N/25 mm] | 27.5 | 21.5 | 20.0 | 14.0 | 20.5 | 14.5 | 27.5 | 21.5 | 28.5 | 22.5 | 28.5 | 22.5 | 28.5 | 22.5 |
|  | To SUS (after 24 hours) [N/25 mm] | 30.5 | 24.5 | 23.0 | 17.0 | 23.5 | 17.5 | 30.5 | 24.5 | 31.5 | 25.5 | 31.5 | 25.5 | 31.5 | 25.5 |
|  | To PP (after 20 minutes) (N/25 mm) | 25.5 | 19.5 | 18.0 | 12.0 | 18.5 | 12.5 | 25.5 | 19.5 | 26.5 | 20.5 | 26.5 | 20.5 | 26.5 | 20.5 |
|  | To PP (after 24 hours) (N/25 mm) | 26.5 | 20.5 | 19.0 | 13.0 | 19.5 | 13.5 | 26.5 | 20.5 | 27.5 | 21.5 | 27.5 | 21.5 | 27.5 | 21.5 |
| Retention (offset [mm] or seconds of dropping [s]) |  | 3.5 mm | 3.0 mm | 7.5 mm | 7.0 mm | 8.0 mm | 7.5 mm | 3.0 mm | 2.5 mm | 6.5 mm | 6.0 mm | 7.5 mm | 7.0 mm | 8.0 mm | 7.5 mm |
| Acid Resistance | Adhesion [N/25 mm] | 31.5 | 25.5 | 25.0 | 19.0 | 25.5 | 19.5 | 31.5 | 25.5 | 32.5 | 26.5 | 34.5 | 28.5 | 32.5 | 26.5 |
|  | Adhesion Difference [N/25 mm] | 1.0 | 1.0 | 2.0 | 2.0 | 2.0 | 2.0 | 1.0 | 1.0 | 1.0 | 1.0 | 3.0 | 3.0 | 1.0 | 1.0 |

TABLE 7-continued

| | | Example 15 Adhesive 22 | | Example 16 Adhesive 23 | | Example 17 Adhesive 24 | | Example 18 Adhesive 25 | | Example 19 Adhesive 26 | | Example 20 Adhesive 27 | | Example 21 Adhesive 28 | |
|---|---|---|---|---|---|---|---|---|---|---|---|---|---|---|---|
| | | First Side | Second Side | First Side | Second Side | First Side | Second Side | First Side | Second Side | First Side | Second Side | First Side | Second Side | First Side | Second Side |
| Alkali Resistance | Adhesion [N/25 mm] | 32.0 | 26.0 | 25.5 | 19.5 | 26.0 | 20.0 | 32.0 | 26.0 | 33.0 | 27.0 | 35.0 | 29.0 | 33.0 | 27.0 |
| | Adhesion Difference [N/25 mm] | 1.5 | 1.5 | 2.5 | 2.5 | 2.5 | 2.5 | 1.5 | 1.5 | 1.5 | 1.5 | 3.5 | 3.5 | 1.5 | 1.5 |
| Substrate Adhesiveness | | E | | E | | E | | E | | E | | E | | E | |
| Contamination | | E | | E | | E | | E | | E | | E | | E | |
| Time-Dependent Fingertip Viscosity | | E | | E | | E | | E | | E | | E | | E | |

TABLE 8

| | | Example 22 Adhesive 29 | | Example 23 Adhesive 30 | | Example 24 Adhesive 31 | | Example 25 Adhesive 32 | | Example 26 Adhesive 33 | |
|---|---|---|---|---|---|---|---|---|---|---|---|
| | | First Side | Second Side | First Side | Second Side | First Side | Second Side | First Side | Second Side | First Side | Second Side |
| Coating Thickness [μm] | | 40 | 30 | 40 | 30 | 40 | 30 | 40 | 30 | 40 | 30 |
| Adhesion | To SUS (after 20 minutes) [N/25 mm] | 20.0 | 14.0 | 29.0 | 23.0 | 31.0 | 25.0 | 27.5 | 21.5 | 20.5 | 14.5 |
| | To SUS (after 24 hours) [N/25 mm] | 23.0 | 17.0 | 32.0 | 26.0 | 34.0 | 28.0 | 30.5 | 24.5 | 23.5 | 17.5 |
| | To PP (after 20 minutes) (N/25 mm) | 18.0 | 12.0 | 27.0 | 21.0 | 29.0 | 23.0 | 25.5 | 19.5 | 18.5 | 12.5 |
| | To PP (after 24 hours) (N/25 mm) | 19.0 | 13.0 | 28.0 | 22.0 | 30.0 | 24.0 | 26.5 | 20.5 | 19.5 | 13.5 |
| Retention (offset [mm] or seconds of dropping [s]) | | 1.5 mm | 1.0 mm | 4.5 mm | 4.0 mm | 5.0 mm | 5.5 mm | 3.0 mm | 2.5 mm | 6.5 mm | 6.0 mm |
| Acid Resistance | Adhesion [N/25 mm] | 24.0 | 18.0 | 33.0 | 27.0 | 34.5 | 28.5 | 31.5 | 25.5 | 24.0 | 18.0 |
| | Adhesion Difference [N/25 mm] | 1.0 | 1.0 | 1.0 | 1.0 | 0.5 | 0.5 | 1.0 | 1.0 | 0.5 | 0.5 |
| Alkali Resistance | Adhesion [N/25 mm] | 24.5 | 18.5 | 33.5 | 27.5 | 35.0 | 29.0 | 32.0 | 26.0 | 24.5 | 18.5 |
| | Adhesion Difference [N/25 mm] | 1.5 | 1.5 | 1.5 | 1.5 | 1.0 | 1.0 | 1.5 | 1.5 | 1.0 | 1.0 |
| Substrate Adhesiveness | | E | | E | | E | | E | | E | |
| Contamination | | E | | E | | E | | E | | E | |
| Time-Dependent Fingertip Viscosity | | E | | E | | E | | E | | E | |

As shown in Table 4 to Table 8, it is confirmed that when the double-sided adhesive tape of the embodiment of present invention contains the synthetic rubber (A) including the styrene-isoprene block copolymer, the adhesion-imparting resin (B), and the fatty acid ester (C) with a weight reduction rate of 1 wt % or less after being heated at 150° C. for 10 minutes and based on 100 parts by weight of the synthetic rubber (A), the content of the adhesion-imparting resin (B) is set as 5 parts by weight to 60 parts by weight and the content of the fatty acid ester (C) is set as 0.1 parts by weight to 10 parts by weight. Even in a high-temperature environment, offset or deviation is less likely to occur, the adhesiveness to the substrate can be enhanced, and the pressure-sensitive adhesive layer is less likely to be peeled off from the substrate, so that the double-sided adhesive tape of the embodiment of present invention can be used in a high-temperature environment as compared with that in the prior art.

Particularly, in the case that the content of the diblock is 15 wt % to 70 wt % and the content of the styrene is 20 wt % to 40 wt % in the total amount (100 wt %) of the styrene-isoprene block copolymer, the styrene-isoprene block copolymer has particularly excellent adhesion and cohesive force. In addition, in the case that the adhesion-imparting resin (B) is the terpene phenolic resin and the softening point is 95° C. to 170° C., the cohesive force is particularly excellent.

INDUSTRIAL AVAILABILITY

The synthetic rubber pressure-sensitive adhesive of the present invention can be applied to all adhesive applications to an adherend. For example, it is suitable for the bonding of parts, and can be used as an adhesive sheet in various industrial fields including automobiles, polishing member fixing, building materials, home appliance product, and the like. This application claims the priority benefit of Japanese Patent Application No. 2017-105737, filed on May 29, 2017, and the entirety of each of the above-mentioned patent applications is hereby incorporated by reference herein.

What is claimed is:
1. A synthetic rubber pressure-sensitive adhesive, comprising a synthetic rubber (A), an adhesion-imparting resin (B), and a fatty acid ester (C), wherein the synthetic rubber pressure-sensitive adhesive has the characteristics as follows:
   the synthetic rubber (A) comprises a styrene-isoprene block copolymer, a weight reduction rate of the fatty acid ester (C) after being heated at 150° C. for 10 minutes is 1 wt % or less, and based on 100 parts by weight of the synthetic rubber (A), a content of the adhesion-imparting resin (B) is 5 parts by weight to 60 parts by weight, and a content of the fatty acid ester (C) is 0.1 parts by weight to 10 parts by weight.

2. The synthetic rubber pressure-sensitive adhesive according to claim 1, wherein the synthetic rubber (A) comprises a styrene-isoprene block copolymer with a styrene content of 20 wt % to 40 wt % and a diblock content of 15 wt % to 70 wt %.

3. The synthetic rubber pressure-sensitive adhesive according to claim 2, wherein the adhesion-imparting resin (B) comprises a terpene phenolic resin with a softening point of 95° C. to 170° C.

4. The synthetic rubber pressure-sensitive adhesive according to claim 1, wherein the adhesion-imparting resin (B) comprises a terpene phenolic resin with a softening point of 95° C. to 170° C.

5. A pressure-sensitive adhesive sheet, provided with an adhesive layer formed of the synthetic rubber pressure-sensitive adhesive according to claim 1 on one side or both sides of a substrate.

6. The pressure-sensitive adhesive sheet according to claim 5, used in polishing member fixing applications.

7. A polishing member laminate, integrated by bonding the pressure-sensitive adhesive sheet used in polishing member fixing applications according to claim 6 to a polishing member.

8. A pressure-sensitive adhesive sheet, provided with an adhesive layer formed of the synthetic rubber pressure-sensitive adhesive according to claim 2 on one side or both sides of a substrate.

9. A pressure-sensitive adhesive sheet, provided with an adhesive layer formed of the synthetic rubber pressure-sensitive adhesive according to claim 4 on one side or both sides of a substrate.

10. The pressure-sensitive adhesive sheet according to claim 8, used in polishing member fixing applications.

11. The pressure-sensitive adhesive sheet according to claim 9, used in polishing member fixing applications.

12. A polishing member laminate, integrated by bonding the pressure-sensitive adhesive sheet used in polishing member fixing applications according to claim 10 to a polishing member.

13. A polishing member laminate, integrated by bonding the pressure-sensitive adhesive sheet used in polishing member fixing applications according to claim 11 to a polishing member.

* * * * *